United States Patent Office 3,328,173
Patented June 27, 1967

3,328,173
FREE-FLOWING COLD WATER SOLUBLE
ACID COMPOSITIONS
John H. Van Ness, Kirkwood, and Darwin O. Stephens, Affton, Mo., assignors to Monsanto Company, a corporation of Delaware
No Drawing. Filed Mar. 17, 1964, Ser. No. 352,665
8 Claims. (Cl. 99—78)

This invention relates to cold water soluble acid compositions. More particularly, this invention relates to improved free-flowing cold water soluble fumaric acid and/or adipic acid compositions, and to beverage mixes including such compositions.

The terms "cold water soluble" and "readily soluble in cold water" as used herein connote fumaric acid and/or adipic acid containing products that substantially completely dissolve in about 100 parts by weight of water at about 5 to 10° C. within one minute and with a minimum of agitation. The intensity of agitation required need only be sufficient to expose the acid particles to successive portions of water and to eliminate the formation of a quiescent envelope of a saturated acid solution about each of the particles.

There have been many attempts to improve the solubility behavior of fumaric and/or adipic acid in cold water. One of the known methods is to add a suitable surfactant and mill the commercially available acid crystals to an average particle size of about 20 to 50 microns. This size limitation was found to be necessary in order to avoid excessive packing and the formation of agglomerates which occurs when the average particle size is less than about 20 microns. It is also well known that the addition of flow conditioners, such as tricalcium phosphate, silica aerogel, calcium sulfate, sodium aluminum silicate, sodium benzoate, and the like, aid in overcoming the tendency to pack. It is further known that it is necessary for solid particles to be substantially uniform in order to avoid size separation. However, when the prior art flow conditioning agents were reduced to an average particle size of less than 20 microns, the prior art flow conditioning agents became extremely dusty, were readily air borne, and when added to water, formed a frosty film upon the surface of the water that is very unsightly and unappealing.

It was found that certain flow conditioning agents having an average particle size of less than 1 micron, when admixed with a surfactant coated fumaric and/or adipic acid crystals having an average particle size of about 10 microns, provide acid compositions that display excellent cold water solubility and improved storage stability, that is, the acid compositions of this invention display minimum packing and agglomerate formation. In addition, such compositions readily dissolve in cold water without formation of the aforesaid undesirable frosty film.

It is therefore an object of this invention to provide an improved free-flowing cold water soluble acid composition.

Another object of this invention is to provide an improved free-flowing water soluble acid composition utilizing a non film-forming flow conditioner.

A further object of this invention is to improve the solubility of a free-flowing acid composition by utilizing an average particle size of less than about 15 microns.

These and other objects are accomplished in accordance with the present invention by mixing fumaric acid, adipic acid, or mixtures thereof with a suitable wetting agent, milling the surfactant treated acid particles to an average particle size of from about 7 to 15 microns, and thereafter admixing a flow-conditioner having anti-caking characteristics at an average particle size of less than about 1 micron. The acid composition thus produced displays improved flowability and reduced anti-caking tendencies over a wide range of ambient temperature and humidity conditions after extended periods of storage.

More specifically, this invention contemplates improving the solubility of surfactant treated adipic and/or fumaric acid by milling the surfactant treated acid particles to an average particle size of from about 7 to 15 microns, preferably from 10 to 12 microns, and thereafter adding a finely divided flow conditioning agent that imparts caking and agglomerate formation resistance to the finely divided surfactant treated acid particles.

Such flow conditioners have an average particle size of less than 1 micron and, although generally considered to be water insoluble, are sufficiently soluble in water so that the amount required to impart the aforesaid characteristics does not exceed its solubility in cold water. Representative examples of such flow conditioners include magnesium and calcium carbonate. It is preferred to use commercially available precipitated calcium carbonate having a particle size ranging from about 0.7 to about 1.5 microns in length and from about 0.1 to about 0.5 micron thick, or an average particle size of about 0.6 micron. The uniformity of these particles are such that only about 0.01% is retained on a 325 mesh (40 micron) screen.

In producing the acid compositions of this invention, it is preferred to treat the commercially available acid crystals with a dilute solution of surfactant, dry the dampened particles, mill the treated and dried acid particles to an average particle size of about 10 microns, and thereafter, blend the finely divided flow-conditioner particles into the finely milled treated acid particles. It is equally possible to add a solid surfactant to the particles and simultaneously mill and mix the acid particles and surfactant until the requisite particle size and intimacy of contact is achieved between the acid particles and the surfactant. The flow-conditioning agent is thereafter blended into the finely divided admixture of surfactant and acid particles.

The proportion of flow-conditioning agent is preferably from about 0.1 to about 3.0% by weight of acid. Generally, compositions containing less than about 0.1% by weight of anti-caking agent do not exhibit the desired stability whereas amounts greater than about 3% of the anti-caking agent serves no useful purpose.

The proportion of surfactant used is at least 0.01% by weight of acidulant, and preferably between about 0.1% and about 1.0% by weight of acid. It is only necessary to add sufficient surfactant to impart a desired solubility to the acid particles. It is understood that the surfactant selected must be compatible with the acidulant and the anticaking agent, capable of wetting the surface of the acid particles, and readily miscible with water. It is also understood that the surfactant selected for use in food products must also be non-toxic. The surfactants contemplated within this invention can be anionic, non-ionic, or cationic. Further, mixtures within each class, mixtures of anionic and non-ionic and mixtures of cationic and non-ionic surfactants are also contemplated.

Representative examples of suitable non-ionic surfactants include polyethenoxy ethers of alkyl phenols, polyethenoxy ethers of alcohols, difunctional and polyfunctional polyethenoxy esters, polyethenoxy esters, polyethoxy compounds with amide links, polyhydroxy esters, polyoxypropylene glycol esters, etc.

Representative examples of suitable anionic surfactants include carboxylic acids with intermediate links, monoglycerides, monoglycol esters of fatty acids, sulfuric esters such as alkyl alkali metal sulfates, sulfated partially etherified glycerols, esters and ether linked sulfonates, amide linked sulfonates, higher alkyl aryl sulfonates, etc.

Representative examples of cationic surfactants include non-quaternary nitrogen bases, such as formed by the condensation reaction of ethylene oxide with a primary amine, which can also have ether and ether intermediate linkages, quaternary nitrogen bases, such as formed by the reaction of lead tertiary amine with alkyl halide or sulfate, etc.

The preferred classes of surface-active agents are the non-ionic and the anionic surface-active agents, particularly when incorporated into an acid composition utilized as an acidulant in foods for human consumption.

The present invention is better understood by the following examples setting forth representative starting materials, quantities thereof, and modes of preparation. It should be emphasized that such examples are not to be construed as limiting the scope of this invention, but are solely for the purpose of illustration.

Example I

Twenty-five pounds of dry commercially available crystalline fumaric acid is introduced into a ribbon blender and there is mixed therein approximately (0.1 pound of di-(2-ethylhexyl)-sodium sulfosuccinate (0.4% anionic surfactant by weight of acid). The acid crystals and surfactant are thereafter milled to an average particle size of about 10 microns. To the milled surfactant coated acid particles, there is added about 0.25 pound (1.0% $CaCO_3$ by weight of acid) of precipitated calcium carbonate (average particle size of about 0.6 micron) with mixing to insure uniform distribution. The product thus obtained is a dry free-flowing fumaric acid composition having an average particle size of about 10 microns. A 3.2 gram sample of this composition readily dissolves in 2 quarts of water at 6° C. with substantially no formation of a scum-like surface.

The acid composition thus obtained is particularly desirable whenever cold water solubility of fumaric and/or adipic acid is required, and particularly when such composition may be stored over an extended period of time at ambient conditions. One such use is in fruit flavored beverage mixes which are intended to be dissolved in cold water. Such mixes typically contain sweeteners, such as sugar, and edible acid, flavoring and coloring.

A typical beverage base for fruit drinks is prepared by charging a Day ribbon blender with from about 4 to 9 pounds (14 to 29% by total weight of beverage base) of the acid composition, from about 0.1 to 0.6 pound of artificial fruit flavoring (from about 0.25 to 1.75% by weight of beverage base) about 0.05 pound (approximately 0.2% by weight of beverage base) of a suitable non-toxic, water soluble red dye, and the balance (from about 24 to 18 pounds) dextrose. After about 5 minutes of operation, a 14.2 gram sample is taken and added to 2 quarts of water at 6° C. The sample dissolves readily. The balance of the material is milled for another 25 minutes. A 14.2 gram sample added to 2 quarts of water at 6° C. shows substantially identical solubility characteristics. It is understood that sufficient sweetener, natural or synthetic, is added thereafter according to taste.

The remainder of the acid composition and beverage base, after over 3 months bulk storage (June-October) at ambient conditions displayed no perceptible difference in physical characteristics or solubility behavior in cold water.

Example II

The procedure of Example I is repeated utilizing polyoxyethylene sorbitan stearate, a non-ionic surfactant. There is obtained an improved acid composition and beverage base that possesses excellent flowability and cold water solubility characteristics which is maintained after over 3 months storage at ambient conditions.

Example III

The procedure of Example I is repeated utilizing methyl dodecylbenzene trimethyl ammonium chloride, a cationic surfactant. There is obtained an improved acid composition and beverage base that possesses excellent solubility and flowability characteristics in cold water which is maintained after over 3 months storage (June-October) at ambient conditions.

The foregoing procedure is repeated using the following surfactants: sodium lauryl sulfonate, sodium dodecylbenzene sulfonate and polyoxyethylene nonyl phenol. In each instance, the acid compositions and/or beverage bases thus prepared display improved flowability and cold water solubility characteristics after extended storage at ambient conditions.

The procedure set forth in Example I is further repeated utilizing magnesium carbonate and the surfactants identified in Examples I, II and III. The resulting magnesium carbonate containing acid compositions or beverage bases yield substantially identical results as the calcium carbonate acid compositions.

Numerous modifications will readily suggest themselves to those skilled in the art. Thus, while the invention has been described with particular reference to specific embodiments, it is to be understood that it is not limited thereto, but is to be construed broadly and restricted solely by the scope of the appended claims.

The embodiments of the invention in which an exclusive property or privilege is claimed are defined as follows:

1. A dry, substantially non-hygroscopic free-flowing acid composition readily soluble in cold water after extended storage at ambient conditions comprising a dry, substantially uniformly sized powdered acid selected from the group consisting of adipic acid and fumaric acid coated with a compatible surfactant admixed with a substantially uniformly sized flow conditioner selected from the group consisting of calcium carbonate and magnesium carbonate, said acid and said flow conditioners having an average particle size of less than about 15 microns.

2. An acid composition according to claim 1 wherein said surfactant is present in an amount from about 0.01 to 1% by weight of said acid.

3. An acid composition according to claim 1 wherein said flow conditioner is present in an amount from about 0.1 to 3% by weight of said acid.

4. A dry, substantially non-hygroscopic free-flowing acid composition readily soluble in cold water after extended storage at ambient conditions comprising a dry acid selected from the group consisting of adipic acid and fumaric acid substantially uniformly coated with about 0.01 to 1% by weight of said acid of a compatible surfactant and having uniformly dispersed therethrough from about 0.1 to 3% by weight of said acid of a substantially uniformly sized flow conditioning agent selected from the group consisting of calcium carbonate and magnesium carbonate, said composition having an average particle size of less than about 15 microns.

5. An acid composition according to claim 4 wherein said flow conditioning agent is calcium carbonate having an average particle size of about 0.6 micron.

6. An acid composition according to claim 5 wherein said acid is fumaric acid having an average particle size of from about 10 to 12 microns.

7. An acid composition according to claim 5 wherein said acid is adipic acid having an average particle size of from about 10 to 12 microns.

8. A cold water soluble fruit flavored beverage base which comprises from about 14 to 29% by weight of beverage base of an acid composition having improved flowability and cold water solubility characteristics in cold water after extended storage at ambient conditions, from about 0.25 to 1.75% by weight of said beverage base of fruit flavoring, about 0.2% by weight of beverage base of coloring, and the balance dextrose, said acid composition comprising a dry, substantially uniformly sized powdered acid selected from the group consisting of adipic and fumaric acid coated with from about 0.01 to 1% by weight of said acid of a compatible surfactant and having uniformly dispersed therethrough from about 0.1 to 3% by weight of said acid of a substantially uniformly sized flow conditioning agent selected from the group consisting of calcium carbonate and magnesium carbonate, said acid and said flow conditioning agent having an average particle size of less than about 15 microns.

No references cited.

LOUIS MONACELL, *Primary Examiner.*

M. VOET, *Assistant Examiner.*